United States Patent
Ramachandra et al.

(10) Patent No.: US 9,921,877 B2
(45) Date of Patent: Mar. 20, 2018

(54) INTELLIGENT AUTO-SCALING

(71) Applicants: HEWLETT-PACKARD DEVELOPMENT COMPANY, L.P., Houston, TX (US); Pramod Kumar Ramachandra, Karnataka (IN); Yogesh Banwarilal Dujodwala, Karnataka (IN)

(72) Inventors: Pramod Kumar Ramachandra, Bangalore (IN); Yogesh Banwarilal Dujodwala, Bangalore (IN)

(73) Assignee: EntIT Software, LLC, Sunnyvale, CA (US)

( * ) Notice: Subject to any disclaimer, the term of this patent is extended or adjusted under 35 U.S.C. 154(b) by 0 days.

(21) Appl. No.: 14/915,284

(22) PCT Filed: Sep. 13, 2013

(86) PCT No.: PCT/IN2013/000557
§ 371 (c)(1),
(2) Date: Feb. 29, 2016

(87) PCT Pub. No.: WO2015/037011
PCT Pub. Date: Mar. 19, 2015

(65) Prior Publication Data
US 2016/0210172 A1    Jul. 21, 2016

(51) Int. Cl.
*G06F 9/46* (2006.01)
*G06F 9/50* (2006.01)
*G06F 17/30* (2006.01)

(52) U.S. Cl.
CPC .......... *G06F 9/5011* (2013.01); *G06F 9/5072* (2013.01); *G06F 9/5083* (2013.01); *G06F 17/3056* (2013.01)

(58) Field of Classification Search
None
See application file for complete search history.

(56) References Cited

U.S. PATENT DOCUMENTS 8,417,938 B1    4/2013    Considine et al.
2005/0223299 A1    10/2005    Childress et al.
(Continued)

FOREIGN PATENT DOCUMENTS

CN    1755634 A    4/2006
CN    101271444 A    9/2008
CN    103154978    6/2013

OTHER PUBLICATIONS

Accelops, Inc., Integrated Data Center and Cloud Service Monitoring Intelligent. Proactive. Secure., Accelops, Inc., May 19, 2010, 6 pages.
International Search Report and Written Opinion, PCT Patent Application No. PCT/IN2013/000557, dated Jun. 16, 2014, 11 pages.
Unknown, Cloud Asset Management—Basic Features, Jun. 15, 2012, 2 pages, http://www.clubcloudcomputing.com/2012/06/cloud-asset-management-basic-features/.
Anticipate IT Issues Before They Impact Your Business, Oct. 1, 2011, XP055351859, Retrieved from the Internet: URL: http://www.hp.com/hpinfo/newsroom/press_kits/2011/optimi.
Extended European Search Report dated Mar. 14, 2017 for EP Application No. 13893561.4; pp. 12.
Hasan M Z et al: Integrated and Autonomic Cloud Resource Scaling; 2012 IEEE Network Operations and Management Symposium (Noms 2012), Maui, HI, Apr. 16-20, 2012.

*Primary Examiner* — Dong Kim

(57) ABSTRACT

Provided is a method of auto-scaling. A state change event notification related to a computing resource associated with a computer application is received. Immediate parent configuration items (CIs) associated with the computer application in a configuration management database (CMDB are identified. Status of the immediate parent configuration items (CIs) associated with the computer application is determined. Auto-scaling is performed if the status of the immediate parent configuration items (CIs) associated with the computer application is normal.

20 Claims, 4 Drawing Sheets

(56) References Cited

U.S. PATENT DOCUMENTS

| | | | |
|---|---|---|---|
| 2007/0168696 A1* | 7/2007 | Ridel | G06F 11/3495 |
| | | | 714/4.1 |
| 2007/0245357 A1 | 10/2007 | Breiter et al. | |
| 2008/0005186 A1* | 1/2008 | Ayachitula | G06Q 10/06 |
| 2009/0249284 A1 | 10/2009 | Antosz et al. | |
| 2009/0265568 A1 | 10/2009 | Jackson | |
| 2009/0287936 A1* | 11/2009 | Ohkado | G06F 21/33 |
| | | | 713/183 |
| 2010/0306275 A1* | 12/2010 | Maheshwari | G06F 17/30306 |
| | | | 707/803 |
| 2011/0012902 A1* | 1/2011 | Rajagopalan | G06F 11/32 |
| | | | 345/440 |
| 2011/0307412 A1* | 12/2011 | Rolia | G06Q 10/06 |
| | | | 705/348 |
| 2012/0023221 A1* | 1/2012 | Dayan | G06F 11/3006 |
| | | | 709/224 |
| 2012/0054331 A1* | 3/2012 | Dagan | G06F 11/0712 |
| | | | 709/224 |
| 2012/0096149 A1 | 4/2012 | Sunkara et al. | |
| 2012/0185735 A1 | 7/2012 | Sambamurthy et al. | |
| 2013/0042003 A1* | 2/2013 | Franco | H04L 67/1097 |
| | | | 709/226 |
| 2013/0219163 A1* | 8/2013 | Sayers | G06Q 10/06 |
| | | | 713/100 |

\* cited by examiner

FIG. 1     100

INTELLIGENT AUTO-SCALING

CROSS-REFERENCE TO RELATED APPLICATION

This application is a U.S. National Stage Application of and claims priority to international Patent Application No. PCT/IN2013/000557, filed on Sep. 13, 2013, and entitled "Intelligent Auto-Scaling." the entire contents of which are hereby incorporated in its entirety.

BACKGROUND

Auto-scaling in a computing environment such as a cloud system is a method that automatically adds or removes computing resources depending upon pre-defined conditions. Auto-scaling allows scaling-up or scaling-down of computing resources such as servers, virtual machines, etc. based on user-defined polices. Auto-scaling releases an organization from planning for provisioning of computing resources in advance. It enables optimum use of computing resources thus reducing costs for an enterprise.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Figure 1:
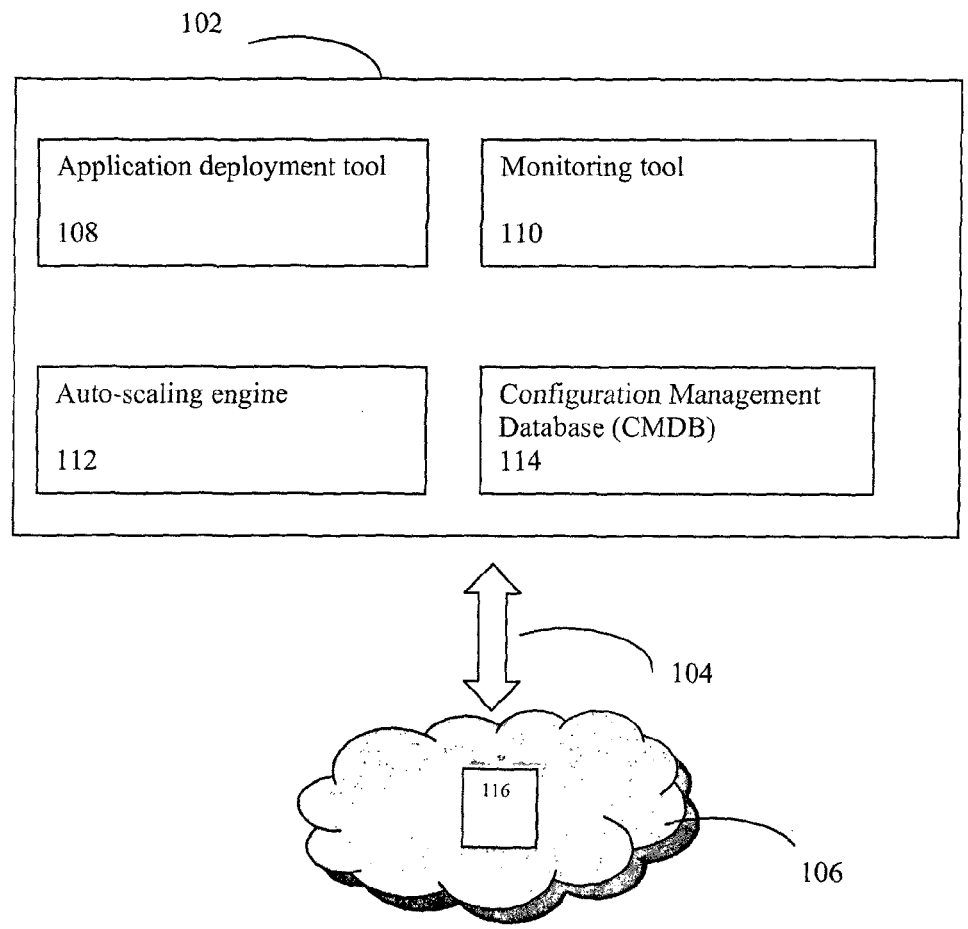
FIG. 1 illustrates a system, according to an example.

It can be difficult for an enterprise to plan for computing resources (such as processing resources, memory resources, network resources, etc.) required, for instance, by a key business application on a continuous basis. The issue could become further challenging if the enterprise is maintaining an application for a third-party such as a client. To provide an example, let's consider a scenario wherein a web application is required to be maintained for a customer. On normal days the web application may experience routine web traffic from users of the customer which may be duly serviced by the server(s) running the web application. However, there may be an increase in user or customer activity after a sales and marketing effort by the customer. In such an event, the existing server(s) may not be able to service the additional user requests related to the web application. Needless to say this could not only lead to loss of sales for the customer but also affect its brand image.

Auto-scaling is a mechanism to automatically scale up or down the number of computing resources that are required by an application based on its needs at any given point of time. Auto-scaling allows a user to define conditions or trigger points that results in automatic scaling-up or down-up of the computing resources required by an application. Once a given condition is met, auto-scaling automatically reacts to take a corresponding action related to scaling of computing resources. In the above mentioned example, auto-scaling may, for example, add additional server resources in response to increased user requests for the web application. Thus, auto-scaling allows dynamic scaling of computing resources.

In order to make auto-scaling decisions related to an application, an auto-scaling workload manager may depend upon events received, for instance, from a monitoring tool coupled to the computing resources supporting the application. However, the events generated by the monitoring tool may or may not represent the actual issue with an application that is being monitored. The unavailability of a business application or degradation in service could be due to failure or issue with any of the associated computing resource items and not necessarily with the application itself. To provide an illustration, let's consider a scenario where a web application is behind a load balancer with cluster auto-scaling. In the event the load balancer goes down due to some reason, the alerts raised by a monitoring tool would be typically with respect to the unavailability of the web application. And in case a workload management rule is to add additional computing resources (for example, by adding new virtual achiness to the cluster), additional resources would not solve the issue since in this particular scenario it is a false alarm raised by the monitoring tool. The downtime is not due to an issue with the web application. It is because of a faulty load balancer which could degrade the performance of the web application. Scaling decisions based on such false positive monitoring events can cause considerable issues in the production environment affecting the business continuity. Thus, an auto-scaling decision based on a monitoring tool alert may not always be accurate.

Proposed is an intelligent auto-scaling solution. The proposed solution involves leveraging Configuration Item (CI) relation data available in a CMDB (Configuration Management Database) into an auto-scaling decision making process to correlate the events generated by the monitoring tool. It provides an efficient and optimal auto-scaling solution that considers the root cause of the problem rather than simply carrying out auto-scaling based on alerts from a monitoring tool.

FIG. 1 illustrates a system 100, according to an example. System 100 includes auto-scaling system 102 and cloud computing environment 104. Auto-scaling system 102 and cloud computing environment 104 may be operationally coupled over a computer network 106.

Auto-scaling system 102 includes application deployment tool 108, monitoring tool 110, auto-scaling engine 112 and CMDB (Configuration Management Database) 114. In an implementation, auto-scaling system 102 may be present on a host computer system which, by way of example, may be a computer server, desktop computer, notebook computer, tablet computer, mobile phone, personal digital assistant (PDA), or the like. The host computing system may include a processor for executing machine readable instructions and a memory (storage medium) for storing machine readable instructions. Although in the present illustration, auto-scaling system 102 and cloud environment 104 are shown as distinct components. However, in another implementation, auto-scaling system 102 may be a part of cloud environment 104.

Application deployment tool 108 may include a computer program (machine executable instructions) or module which is required to make an application available to a user. Application deployment is a process of installing an application in a server context and includes processes required in getting an application up and running properly in its environment, which may include installation, configuration, execution, testing, etc. Server vendor specified checks are executed in a deployment process and deployment steps depend on the server type. For example, a web application may be a deployed on a web server. In an implementation, application deployment tool 108 is a DevOps tool such as, but not limited to, Hewlett-Packard's Continuous Delivery Automation (HP CDA). Application deployment tool 108 can deploy an application along with required monitoring policies to monitor the application and an associated computing platform. In an implementation, application deployment tool 108 deploys an application on cloud server in cloud computing environment 104.

Monitoring tool 110 is a module that performs monitoring of computing resources. In an instance, monitoring tool 110 may perform monitoring of computing resources associated with a computer application. Computing resources may include software (such as applications, file utilities, etc.), storage resources (for example, disk drives, magnetic tapes, etc.), network resources, memory resources, processing resources, and the like. Monitoring of computing resources by using either an agent-based or agent-less mechanism.

In the agent-based solution, a software module called agent is installed on each IT system (for example, a server) to be monitored. The agents are configured to collect performance metrics depending on the application and the hardware profile of the IT system. The functionality of the agent also extends to storing of collected data locally, raising alarms and resolving the same by taking corrective actions independently. They can monitor the status (availability and performance) of applications, servers, and network devices in more detail than common management tools.

Agent-less technology allows monitoring and management of an IT environment remotely, over the network, without having to install agents on the components to be monitored. The agent-less solution involves monitoring an IT system remotely by collecting data periodically using standard interfaces. It allows administrators to get monitoring up and running more quickly.

Selecting an agent-based or agent-less monitoring solution for a monitoring tool 110 depends on the criticality of the system or application to a company's business revenue and processes. Hence, business criticality of the systems plays a major role in determining the solution to be deployed to monitor the system. A configuration management database (CMDB) 114 may help in making that selection.

Monitoring tool 110 may monitor various parameters of a computing resource related to, for instance, its performance, availability, security, and other like factors. In an instance, monitoring tool 110 monitors for a state change event related to a computing resource and provides state change event notification to auto-scaling engine 112. State change events indicate changes in the availability, performance, security, or other pre-defined factors related to a computing resource. Monitoring tool 110 may depend on a policy interface to define monitoring. In an implementation, monitoring tool 110 monitors an application on cloud server in cloud environment 104. It monitors for any state change event in a computer resource associated with the application and provides a notification of such event to auto-scaling engine 112.

Auto-scaling engine 112 performs scaling-up or scaling-down of the computing resources that are required by an application at a given time. Auto-scaling engine 112 depends on a user-defined conditions or trigger points to automatically scale-up or scale-down computing resources required by an application. Once a given condition is met, auto-scaling engine 112 automatically reacts to take a corresponding action related to scaling of computing resources. In an implementation, auto-scaling engine 112 may, for example, add additional server resources in response to increased user requests (an example "event") for application on cloud server in cloud computing environment 104. On receiving an event, auto-scaling engine 112 makes auto-scaling decisions based upon user or pre-defined configured rules in an associated workload manager rule engine.

CMDB (Configuration Management Database) 114 is a comprehensive warehouse of information related to all the components of an IT network. It provides a single central point view of the relationships between an IT infrastructure and business services. CMDB utilizes 114 a data model that accommodates not only physical components such as servers, networking and storage devices, and software but also logical elements key to business service delivery, such as business applications, virtual private networks, end users and service level agreements. HP Universal Configuration Management Database (HP CMDB) is an example of one such tool.

Configuration management database (CMDB) 114 describes configuration items (CI) in an information technology environment and the relationships between them. A configuration item basically means component of an IT infrastructure or an item associated with an infrastructure. A CI may include, for example, servers, computer systems, computer applications, routers, etc. The relationships between configuration items (CIs) may be created automatically through a discovery process or inserted manually. Considering that an IT environment can be very large, potentially containing thousands of CIs, the CIs and relationships together represent a model of the components of an IT environment in which a business functions. CMDB 114 stores these relationships and handles the infrastructure data collected and updated by a discovery process. A mark-up language such as, but not limited to, Extensible Markup Language (XML) may be used to define configuration items. Each CI may have one or more properties (enrichments) that may describe the type of the system (test system, end-user system, etc.), location of a system, etc.

Figure 2:
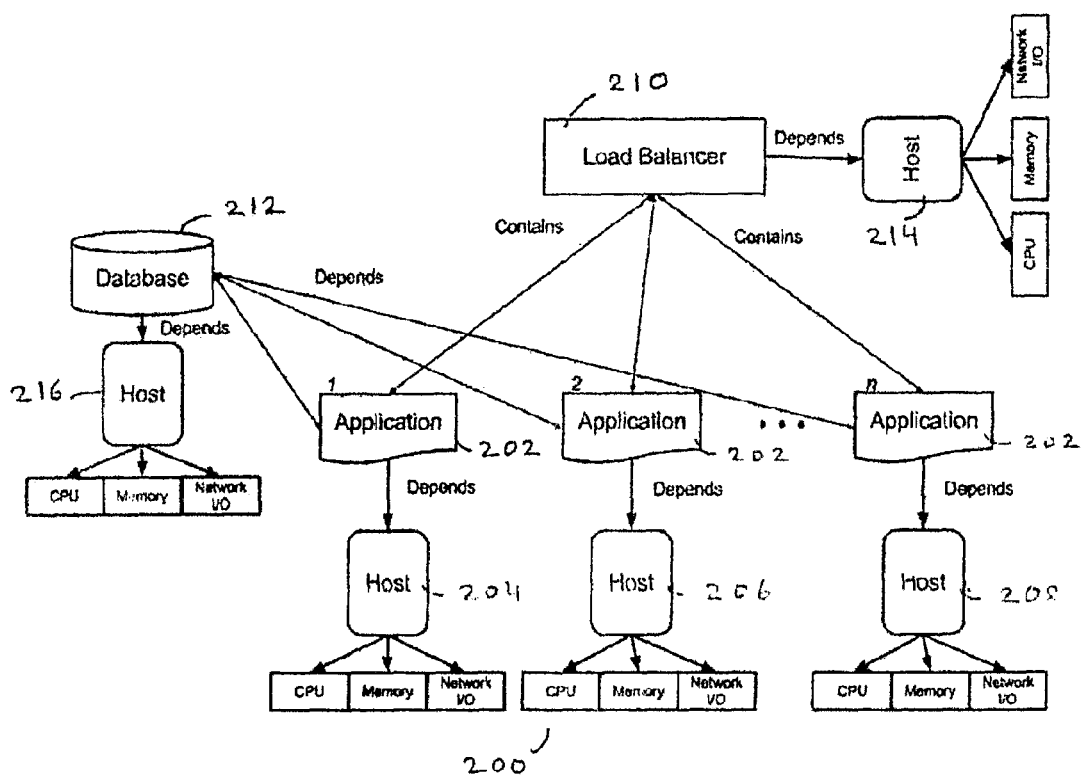
FIG. 2 illustrates a topology map of an application, according to an example.

A configuration item may have several characteristics such as attributes, status value, type, and relationships. Relationship of a CI defines how a CI is related to other CIs. For instance, a configuration item association type template may be used for creating a child to parent relationship between configuration items. This association links child configuration items to a parent configuration item. For example, a computer system can have many child CIs, such as a CPU, memory, network I/O, operating system, etc. FIG. 2 illustrates a CMDB topology map 200 of an application on a cloud server in a cloud computing environment, according to an example. In the present illustration, multiple copies of an application 202 are hosted on host cloud servers 204, 206, and 208. CMDB topology map 200 also includes load balancer 210 and database 212 hosted on host cloud servers 214 and 216 respectively. Each host cloud server 204, 206, 208, 214 and 216 may include a CPU, a memory unit, and a network I/O interface. In the context of a CMDB configuration, each of the above mentioned components may be considered as a configuration item. In other words, application 200, load balancer 210, database 212, host cloud servers 204, 206, 208, 214 and 216, and their respective CPUs, memory units, and network I/O interfaces may be considered as configuration items. In an implementation, child to parent relationships may be defined between configuration items. The association links child configuration items to a parent configuration item. For example, parent configuration items for CI "application" 200 may include load balancer 210, database 212, host cloud server 204 and its associated CPU, memory unit, and network I/O interface. Among aforesaid, "immediate parent" configuration items for CI "application 200" may be defined to include load balancer 210, database 212, and host cloud server 204. The rest (host cloud servers 206, 208, 214 and 216 their respective CPUs, memory units, and network I/O interfaces) may be termed as remote CIs for CI "application" 200.

In an embodiment, as a pre-requisite, CMDB 114 is populated using a discovery mechanism and business topology is modeled in CMDB 114. The impact of a system on a business service or revenue is derived from the business service topology stored in CMDB 114. The discovery process enables collection of data about an IT environment by discovering the IT infrastructure resources and their interdependencies (relationships). The process can discover such resources as applications, databases, network devices, different types of servers, and so on. Each discovered IT component is discovered and stored in the configuration management database where it is represented as a managed configuration item (CI).

Cloud computing environment (or "cloud") 104 includes a cloud server that hosts a computer application 116. By way of a non-limiting example such computer application may be a web application. Generally speaking, cloud computing involves delivery of computing as a service rather than a product, whereby shared resources (software, storage resources, etc.) are provided to computing devices as a service. The resources are shared over a network, which is typically the internet. Cloud computing environment 104 may a private cloud, public cloud or hybrid cloud.

Computer network 106 may be a wired (for example, a coaxial cable) or wireless (for example, Wi-Fi) network. In an implementation, computer network 106 is the Internet.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

It would be appreciated that the system components depicted in FIG. 1 are for the purpose of illustration only and the actual components may vary depending on the computing system and architecture deployed for implementation of the present solution. The various components described above may be hosted on a single computing system or multiple computer systems, including servers, connected together through suitable means.

Figure 3:
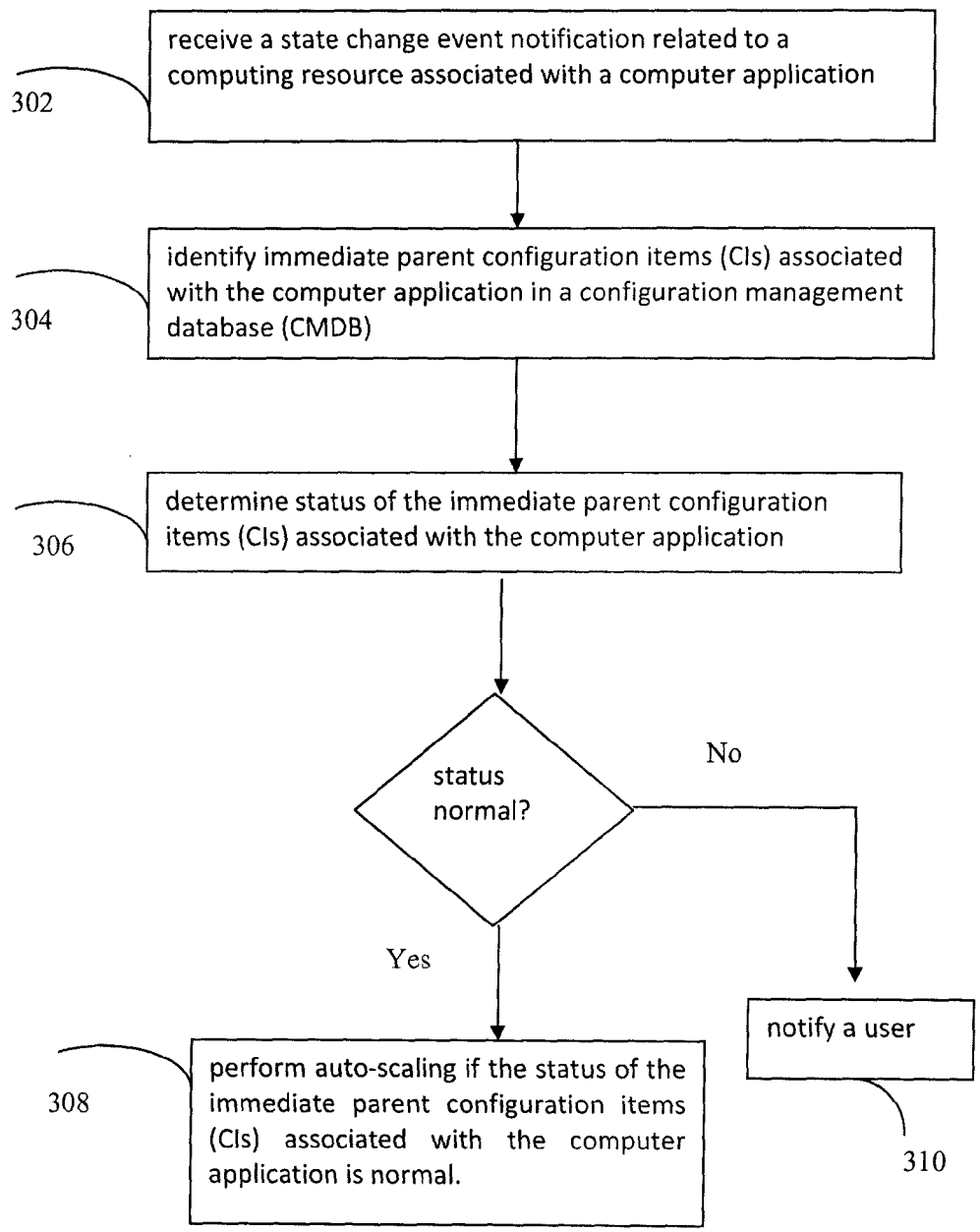
FIG. 3 shows a flow chart of a method of auto-scaling, according to an example.

FIG. 3 shows a flow chart of a method of auto-scaling, according to an example.

At block 302, a state change event notification related to a computing resource associated with a computer application is received by an auto-scaling engine. In an implementation, the computer application is deployed in a cloud computing environment on a cloud server using an application deployment tool. A monitoring tool monitors computing resources associated with the computer application. Some non-limiting examples of computing resources which may be monitored include software resources (such as file utilities), storage resources (for example, disk drives, magnetic tapes, etc.), network resources, memory resources, and processing resources associated with the computer application. For example, let's consider a scenario wherein multiple copies of a web application are hosted on a plurality of cloud servers along with a load balancer to manage workloads and a database for storing processing or other form of related data. In such case, a monitoring tool may monitor computing resources such as CPUs, memory units, network I/O interfaces etc associated with the computer application, load balancer and database. In the event monitoring tool identifies a state change event in any of the computer resource associated with the computer application, it provides a notification of such event to an auto-scaling engine. A state change event may relate to, by way of example, a change in the availability, performance, security, or other pre-defined factor related to a computing resource.

In an implementation, the auto-scaling agent that receives a state change event notification related to a computing resource associated with a computer application is a component of an auto-scaling system along with the monitoring tool and application deployment tool. However, in another implementation, aforementioned tools (auto-scaling engine, monitoring tool, and application deployment tool) may be distinct components coupled to each other.

At block 304, immediate parent configuration items (CIs) associated with the computer application are identified from a configuration management database (CMDB), which maintains a topology map of the computer application. The Configuration management database (CMDB) describes configuration items (CI) associated with the computer application and the relationships between them. A configuration item basically means component of an IT infrastructure or an item associated with an infrastructure. A configuration item may have several characteristics such as attributes, status value, type, and relationships. Relationship of a CI defines how a CI is related to other CIs. For instance, a configuration item association type template may be used for creating a child to parent relationship between configuration items. This association links child configuration items to a parent configuration item. To provide an illustration, in the context of the web application mentioned earlier, the topology map of the web application would include multiple copies of the web application, host cloud servers, load balancer, database, CPUs, memory units, and network I/O interfaces associated with each of the above mentioned components. In an implementation, the auto-scaling engine performs a topology query to the CMDB using a Configuration Management Database Topology Query Language (CMDB TQL) Application Programming Interface (API) to identify parent configuration items (CIs) of the web application. Upon receipt of the topology query, the CMDB generates a list of parent CIs associated with the web application and provides the list to the auto-scaling engine. In an example, the list of parent CIs is generated in a mark-up language format such as, but not limited to, Extensible Markup Language (XML). The auto-scaling engine parses the mark-up language response and identifies the immediate parent configuration items related to the web application from the parent CIs.

At block 306, status of immediate parent configuration items (CIs) associated with the computer application is identified. In an implementation, the monitoring tool is used to identify current status of immediate parent configuration items (CIs) associated with the computer application. In other words, each identified immediate parent configuration item is checked to determine whether it is performing as per expectations. The monitoring tool shares the status report of each identified immediate parent configuration item with the auto-scaling engine.

If the status of an immediate parent configuration items (CIs) associated with the computer application is normal, auto-scaling of computing resources associated with the computer application is performed (block 308). In other words, if a determination is made that all immediate parent configuration items (CIs) associated with the computer application are functioning as per regular or pre-identified course, computing resources associated with the computer application are auto-scaled by the auto-scaling engine. Normal functioning of immediate parent configuration items (CIs) associated with the computer application indicates that there's no issue related to their functioning, and a state change event notification related to a computing resource associated with the computer application indicates an issue with computer application itself. In such case, auto-scaling of computing resources associated with the computer application is carried out to ensure smooth and proper functioning of the computer application. In an example, auto-scaling includes scaling-up and/or scaling-down of the computer resource related to which a state change event notification was received. In another example, auto-scaling may include scaling-up and/or scaling-down of a computer resource other than the computer resource for which a state change event notification was received.

In the event, if the status of an immediate parent configuration items (CIs) associated with the computer application is critical or varies from a pre-defined threshold, no auto-scaling of computing resources associated with the computer application is performed (block 310). In such as event, in an instance, a notification to that effect may be provided to a user. Critical or sub-par functioning of immediate parent configuration items (CIs) associated with the computer application indicates that there's no issue with the-computer application per se, and a state change event notification related to a computing resource associated with the computer application is a false alarm with regards to functioning of the computer application. In such case, auto-scaling of computing resources associated with the computer application is not required. However, a status check related to functioning of immediate parent configuration items (CIs) associated with the computer application may be needed to identify the root cause of a problem that resulted in a state change event notification.

Figure 4:
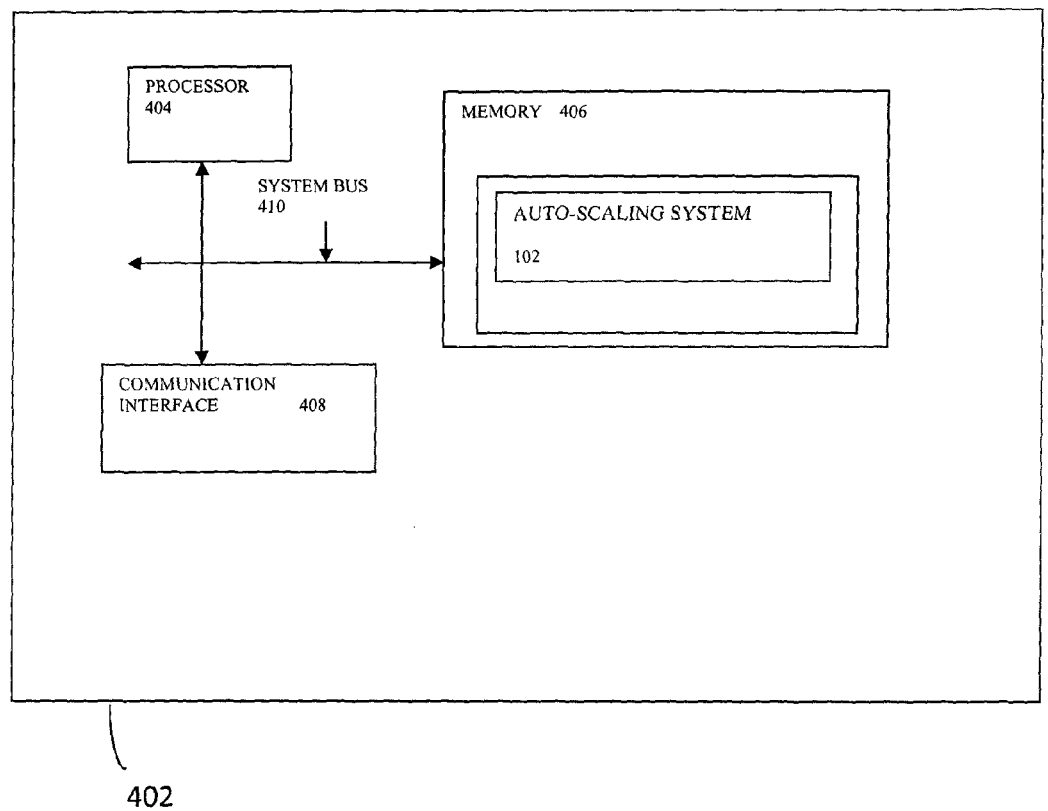
FIG. 4 is a schematic block diagram of an auto-scaling system hosted on a computer system, according to an example.

FIG. 4 is a schematic block diagram of an auto-scaling system hosted on a computer system, according to an example.

Computer system 402 may include processor 404, memory 406, auto-scaling system 102 and a communication interface 408. The components of the computing system 402 may be coupled together through a system bus 410.

Processor 404 may include any type of processor, microprocessor, or processing logic that interprets and executes instructions.

Memory 406 may include a random access memory (RAM) or another type of dynamic storage device that may store information and instructions non-transitorily for execution by processor 404. For example, memory 406 can be SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. Memory 406 may include instructions that when executed by processor 404 implement auto-scaling system 102.

Communication interface 408 may include any transceiver-like mechanism that enables computing device 402 to communicate with other devices and/or systems via a communication link. Communication interface 408 may be a software program, a hard ware, a firmware, or any combination thereof. Communication interface 408 may use a variety of communication technologies to enable communication between computer system 402 and another computer system or device. To provide a few non-limiting examples, communication interface 408 may be an Ethernet card, a modem, an integrated services digital network ("ISDN") card, etc.

Auto-scaling system 102 and/or its components: application deployment tool, monitoring tool 110, auto-scaling engine and CMDB (Configuration Management Database) may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. In an implementation, auto-scaling system 102 and/or its components: application deployment tool, monitoring tool, auto-scaling engine and CMDB (Configuration Management Database) may be read into a device memory from another computer-readable medium, such as data storage device, or from another device via a communication interface.

Solution described in this application may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising transitory or non-transitory processor-readable media for carrying or having computer-executable instructions or data structures stored thereon. Such processor-readable media can be any available media that can be accessed by a general purpose or special purpose computer. By way of example, such processor-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

We claim:

1. A method, comprising:
    receiving a state change event notification related to a computing resource associated with a computer application;
    in response to receiving the state change event notification:

identifying immediate parent configuration items (CIs) associated with the computer application in a configuration management database (CMDB);

determining whether a status of each of the immediate parent configuration items (CIs) associated with the computer application is within a pre-defined threshold, wherein the immediate parent CIs exclude the computing resource;

automatically modifying a level of the computing resource associated with the computer application in response to a determination that the status of each of the immediate parent configuration items (CIs) associated with the computer application is within the pre-defined threshold; and maintaining a current level of the computing resource in response to a determination that the status of at least one of the immediate parent CIs associated with the computer application is outside the pre-defined threshold.

2. The method of claim 1, wherein modifying the level of the computing resource includes automatically scaling-up the computer resource associated with the computer application.

3. The method of claim 1, wherein modifying the level of the computing resource includes automatically scaling-down of the computer resource associated with the computer application.

4. The method of claim 1, further comprising notifying a user in response to the determination that the status of at least one of the immediate parent configuration items (CIs) associated with the computer application in the configuration management database (CMDB) is outside the pre-defined threshold.

5. The method of claim 1, wherein identifying the immediate parent configuration items (CIs) associated with the computer application in a configuration management database (CMDB) comprises:

performing a topology query related to the computer application in the configuration management database (CMDB); and identifying parent configuration items (CIs) associated with the computer application in the configuration management database (CMDB).

6. The method of claim 5, wherein the immediate parent configuration items (CIs) are identified from the parent configuration items (CIs) associated with the computer application in the configuration management database (CMDB).

7. The method of claim 5, wherein the configuration management database (CMDB) is defined using Extensible Markup Language (XML).

8. The method of claim 1, wherein the state change event notification is received from a tool monitoring the computing resource associated with a computer application.

9. The method of claim 1, wherein modifying the level of the computing resource comprises increasing a count of virtual machines associated with the application.

10. A system, comprising:
a hardware processor; and
a non-transitory storage medium storing instructions executable on the hardware processor to:
receive a state change event notification related to a computing resource associated with a computer application;
in response to receipt of the state change event notification:
identify, using a CMDB (Configuration Management Database) a list of parent configuration items (CIs) associated with the computer application with the auto-scaling engine;
determine whether a status of each of the immediate parent configuration items (CIs) is within a pre-defined threshold, wherein the immediate parent CIs exclude the computing resource;
automatically modify a level of the computing resource associated with the computer application in response to a determination that the status of each of the immediate parent configuration items (CIs) is within the pre-defined threshold; and
maintain a current level of the computing resource in response to a determination that the status of at least one of the immediate parent CIs associated with the computer application is outside the pre-defined threshold.

11. The system of claim 10, wherein a monitoring tool provides the state change event notification related to the computing resource associated with a computer application to the system.

12. The system of claim 10, the instructions further executable to:
notify a user in response to the determination that the status of at least one of the immediate parent configuration items (CIs) associated with the computer application is outside the pre-defined threshold.

13. The system of claim 10, wherein the CMDB maintains a topology map of configuration items (CIs) associated with the computer application.

14. The system of claim 10, wherein the computing resource associated with a computer application includes one of: a storage resource, a network resource, a memory resource, and a processing resource.

15. A non-transitory processor readable medium, the non-transitory processor readable medium comprising machine executable instructions, the machine executable instructions when executed by a processor causes the processor to:
receive a state change event notification related to a computing resource associated with a computer application;
in response to receipt of the state change event notification:
perform a topology query related to the computer application in a configuration management database (CMDB);
identify parent configuration items (CIs) associated with the computer application in the configuration management database (CMDB);
identify immediate parent configuration items (CIs) associated with the computer application from the parent configuration items (CIs), wherein the immediate parent CIs exclude the computing resource;
determine whether a status of each of the immediate parent configuration items (CIs) is within a pre-defined threshold;
automatically modify a level of the computing resource associated with the computer application in response to a determination that the status of each of the immediate parent configuration items (CIs) is within the pre-defined threshold; and
maintain a current level of the computing resource in response to a determination that the status of at least one of the immediate parent CIs associated with the computer application is outside the pre-defined threshold.

16. The non-transitory computer readable storage medium as recited by claim 15, wherein the instructions to modify the level of the computing resource include instructions to modify a count of virtual machines associated with the application.

17. The non-transitory computer readable storage medium as recited by claim 15, wherein the instructions to modify the level of the computing resource include instructions to increase the level of the computer resource associated with the computer application.

18. The non-transitory computer readable storage medium as recited by claim 15, wherein the instructions to modify the level of the computing resource include instructions to decrease the level of the computer resource associated with the computer application.

19. The non-transitory computer readable storage medium as recited by claim 15, the instructions executable to:
   notify a user in response to the determination that the status of at least one of the immediate parent configuration items (CIs) associated with the computer application is outside the pre-defined threshold.

20. The non-transitory computer readable storage medium as recited by claim 15, wherein the configuration management database (CMDB) is defined using Extensible Markup Language (XML).

* * * * *